March 7, 1933.   W. MAURER   1,900,355
METHOD AND APPARATUS FOR MAKING ICE CREAMS BARS, STICKS, OR THE LIKE
Filed April 4, 1932   3 Sheets-Sheet 1
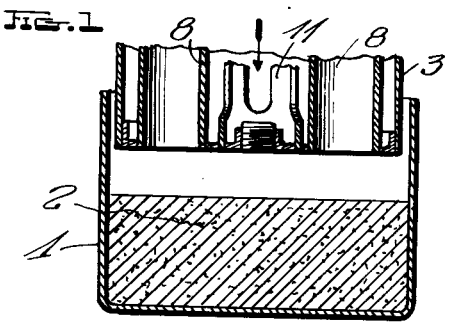
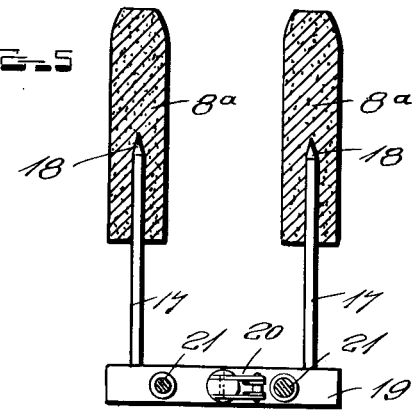
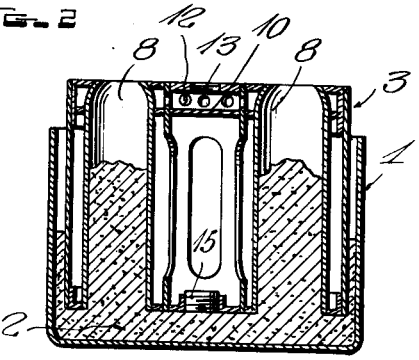
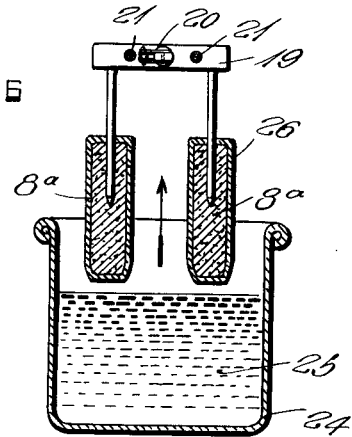
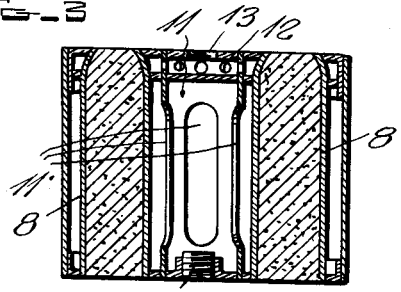
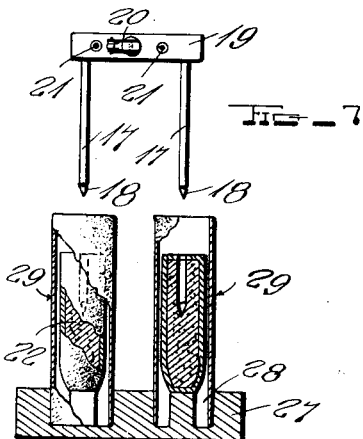
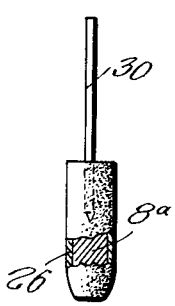
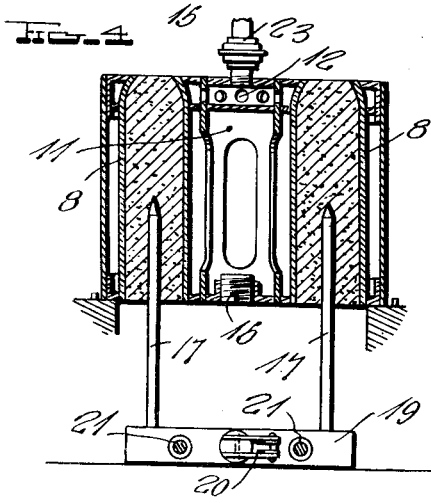
INVENTOR.
William Maurer,
BY
Jacobi & Jacobi ATTORNEYS.

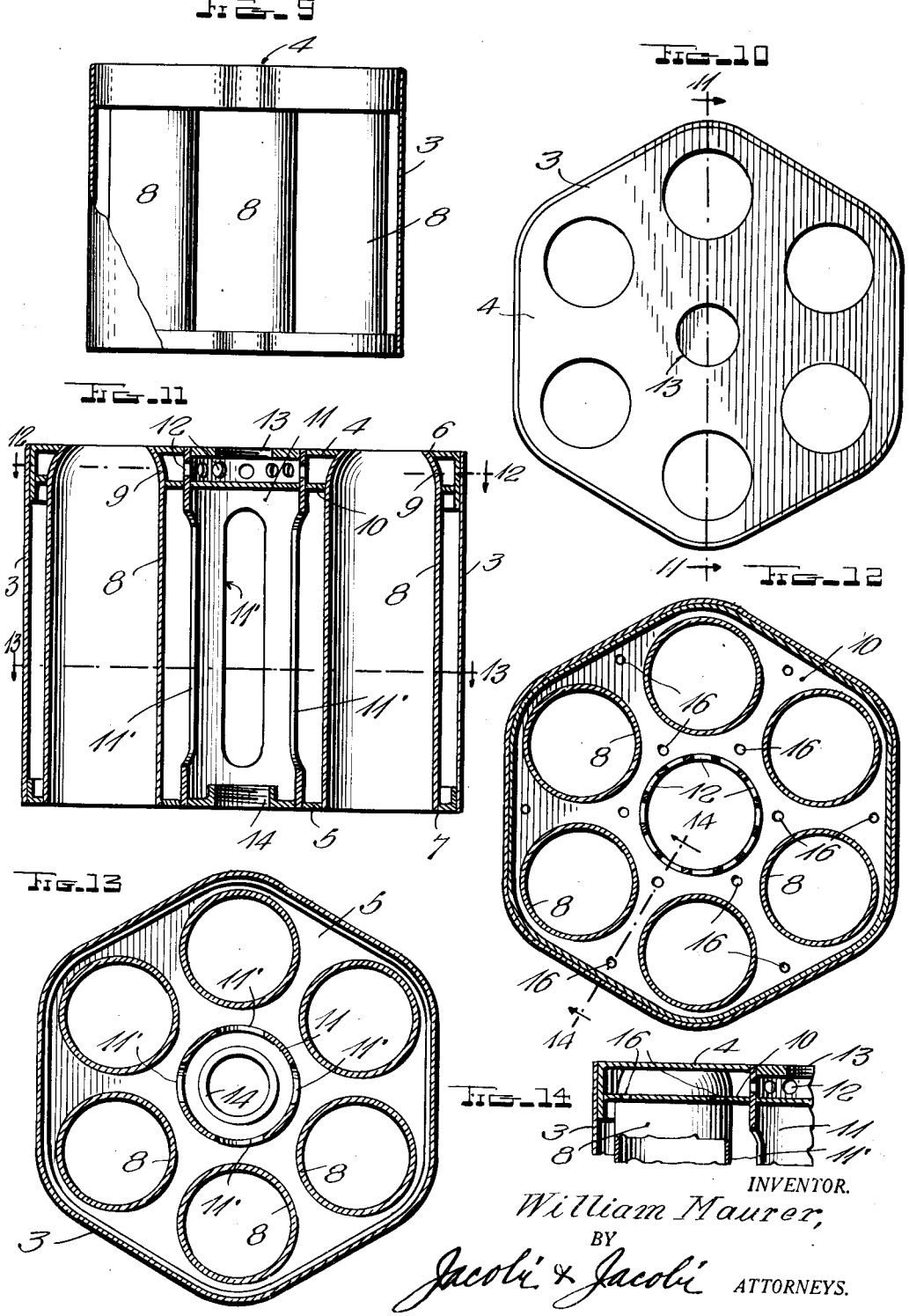

March 7, 1933. W. MAURER 1,900,355
METHOD AND APPARATUS FOR MAKING ICE CREAMS BARS, STICKS, OR THE LIKE
Filed April 4, 1932 3 Sheets-Sheet 3
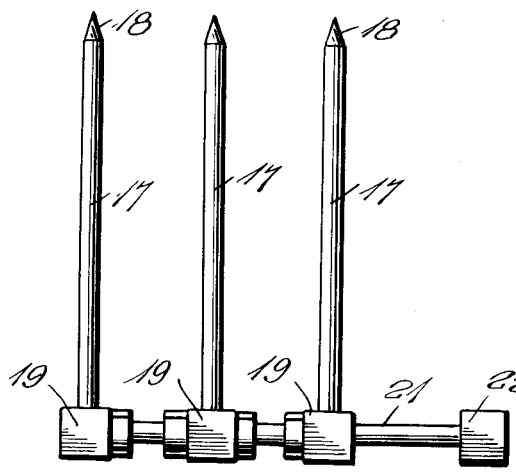
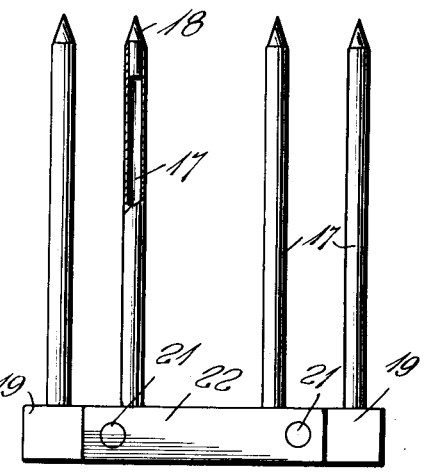
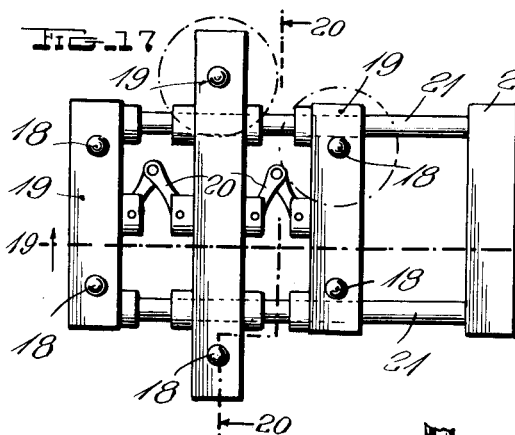
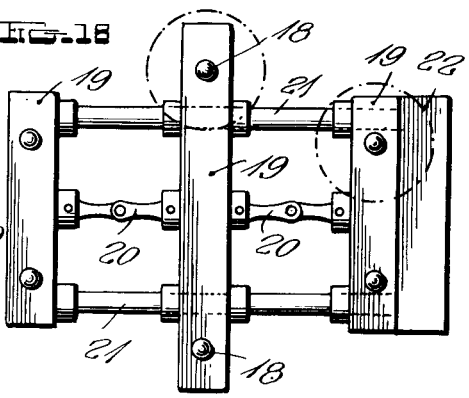
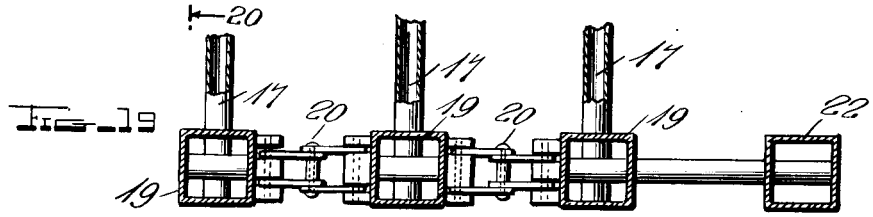
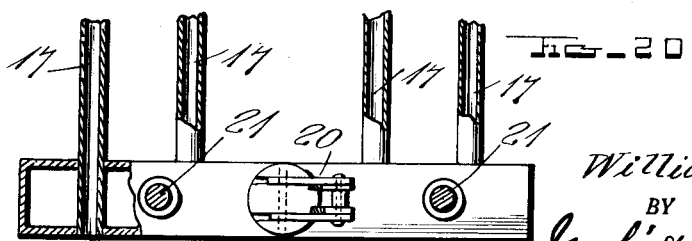
INVENTOR.
William Maurer,
BY
Jacobi & Jacobi ATTORNEYS.

Patented Mar. 7, 1933

1,900,355

UNITED STATES PATENT OFFICE

WILLIAM MAURER, OF QUEENS VILLAGE, NEW YORK

METHOD AND APPARATUS FOR MAKING ICE CREAM BARS, STICKS, OR THE LIKE

Application filed April 4, 1932. Serial No. 603,140.

My invention relates to new and useful improvements in method and apparatus for producing ice cream bars or sticks and more particularly to the production of a bar or stick of ice cream coated with or encased in chocolate supported on a stick so as to be readily handled while eating and the primary object of the invention is to provide such an article which is made in a new and improved manner through new and improved apparatus which article will be tasty, refreshing and which will overcome the difficulties in consumption that have been experienced heretofore in the manufacture of similar confections.

A further object of the invention resides in the provision of an improved method for the formation of a bar or stick of ice cream which is so formed that when coated or encased in chocolate, there will be substantially no melting of the cream, since the bar or stick is formed without corners.

Still another object of the invention resides in an improved method of handling the form for shaping the ice cream into a particular form.

Still another object resides in the method of handling the formed or shaped cream after it is removed from the mold for the coating or the encasing thereof with chocolate.

A still further object resides in the production of an improved mold for the formation of the ice cream bar and a still further object resides in providing an improved means for removing and supporting the ice cream bar or form after it is removed from the mold for the coating or encasing thereof with chocolate.

Still another object resides in the provision of means for the handling of the ice cream from the manufacture of the same to the completion of the bar or stick encased in or coated with chocolate.

With these and numerous other objects in view, my invention consists in the improved method hereinafter set forth and in the novel features of construction and combination hereinafter and more particularly described.

In the accompanying drawings forming a part of this application:

Figure 1 is a fragmentary sectional view of my improved ice cream mold about to be filled with cream;

Figure 2 is a similar view of a mold constructed in accordance with my invention and being filled with the cream as a second step in the method of operation;

Figure 3 is a vertical sectional view of the mold completely filled with cream removed from the ice cream container and about to be placed into a freezing chamber;

Figure 4 is a vertical sectional view of the mold after it has been removed from the freezing chamber and in cooperative relationship with a plurality of pins which form a support and simultaneously provide a central bore in the formed bars or sticks of ice cream into which sticks for handling the cream for consumption may be introduced;

Figure 5 is a sectional view of the device carrying the impaling pins showing the ice cream bars or sticks supported after the mold has been removed;

Figure 6 is a similar view showing the ice cream bars or sticks being removed from a container after the cream has been dipped therein and covered with a chocolate mixture;

Figure 7 is a sectional view showing how the coated or chocolate encased ice cream bars or sticks have been disposed from the impaling pins and positioned within tubular paper or other containers for wrapping;

Figure 8 is a side elevation, partly in section, of the ice cream bar applied to a wooden stick with the paper casing removed;

Figure 9 is a side elevation, partly in section, of a mold constructed in accordance with my invention;

Figure 10 is a top plan view thereof;

Figure 11 is a central vertical section therethrough as seen on the line 11—11 of Figure 10;

Figure 12 is a horizontal section therethrough as seen on the line 12—12 of Figure 11;

Figure 13 is a similar view as seen on the line 13—13 of Figure 11;

Figure 14 is a detail sectional view as seen on the line 14—14 of Figure 12;

Figure 15 is a side elevation of the adjustable block or support carrying the impaling pins;

Figure 16 is an end elevation thereof, partly in section;

Figure 17 is a top plan view thereof;

Figure 18 is a similar view showing the support or block in an extended position;

Figure 19 is a vertical sectional view as seen on the line 19—19 of Figure 17; and Figure 20 is a transverse sectional view as seen on the line 20—20 of Figure 17.

In describing my invention, I shall refer to the drawings in which similar reference characters designate corresponding parts throughout the several views and in which the numeral 1 designates a receptacle or container of any preferred shape or size which contains ice cream, designated by the numeral 2 which cream has been produced in any preferred manner with any preferred ingredients in a semi-frozen condition, such as would be true when cream leaves a mixing machine. Into this receptacle or container 1 is projected or plunged a mold which I have designated generally by the numeral 3 so that this cream 2 in the container or receptacle 1 may be forced into certain portions of the mold to conform thereto. This mold is formed with particularly shaped portions so that the cream may conform thereto, obviously, when the mold is withdrawn.

This particular mold constitutes an essential feature of my invention and will be described in detail. For illustration, I have disclosed a mold of a particular shape and size but it will be understood that this mold may be any size and any shape generally, according to the size of the plant in which it is being used and in accordance with the number of ice cream bars or sticks that are desired to be used in any one operation.

This mold comprises an outer shell or casing having an upper plate member 4 and a lower plate member 5 secured thereto. The upper plate member is provided at definite spaced intervals therein with openings 6 and the lower plate 5 is provided with openings 7 which are of greater diameter than the openings 6 but which are concentric with the latter. Securely held between the plates 4 and 5 and in the openings 6 and 7 therein are the tubular members 8, the upper end portions of which are curved as shown at 9 so that the peripheral edges thereof fit snugly in the openings 6 which are, as stated above, of smaller diameter than the openings 7. These tubular members 8 constitute forms in which the frozen cream will be made and by curving the upper portions thereof as shown by the numeral 9, no sharp corners will be provided on the bar or stick of ice cream formed therein. Disposed in the shell or casing of the mold 3, slightly below the top plate 5 is another plate which I have designated by the numeral 10 and this also is provided with openings in alignment with the openings 6 and 7 through which the tubular members 8 project, as clearly shown in Figure 11 of the drawings.

A central tubular core member 11 is provided which projects through the casing, being mounted in the bottom of the plate 5 at its lower end and mounted at its upper end in the top plate 4. This core member also projects through the plate 10. The core member between the plates 10 and 5 is slotted in its sides as shown at 11'. The portion of the core member between the top plate 4 and the plate 10 forms a cylindrical portion, the walls of which are provided with openings 12. The top plate 4 is provided with a central threaded opening 13 and the bottom plate 5 is also provided with a central threaded opening 14.

When the mold is being plunged into a container of cream, a plug 15 is introduced into the lower opening 14 so as to close said opening and the upper threaded opening 13 forms a means whereby the water pipe or cold air pipe may be engaged therewith at various times during the process of manufacture, as will be hereinafter and more particularly set forth. The plate 10 is also provided at various points throughout its area with openings 16 which provide means for the circulation of water or air through the mold as will be seen from the following description.

As stated previously, this particular mold 3 is introduced under pressure in the receptacle or container 1 which has therein the ice cream in a semi-frozen state. In Figure 2, I have shown the mold being forced into the container with the cream being correspondingly forced into the tubular members 8. At this particular time, the plug 15 is mounted in the lower end of the device so that cream will only enter the tubular portions 8 of the mold. After the cream has been forced into tubular portions 8 of the mold so that said tubular portions are entirely filled with the ice cream, the container with the mold therein is placed into a freezing chamber for a limited period of time as for instance, fifteen minutes so that the cream will freeze to an appreciable extent in the form of the tubular portions 8. Thereupon the container and mold are removed from the freezing chamber and the mold in turn removed from the container or receptacle 1. In order to accomplish this latter removal, it may be necessary to dip the container in water, since it appears obvious that the cream will freeze also around the sides of the mold. Any other means of accomplishing the ready removal of the mold from the container may be used, if desired.

When the mold with the cream frozen in the tubular members 8 has been removed from the receptacle, the plug 15 is removed from the bottom of the mold and a cold air pipe is connected with the threaded opening 13 at the top of the mold. Cold air is then circulated through the mold which assists in the freezing of the cream in the tubular portions 8 and further causes the freezing to occur evenly throughout the mold. After this is accomplished, the plug 15 is then again engaged with the lower threaded opening 14 and the mold with the cream therein is projected over a device containing a plurality of prongs or pins 17, the latter being projected into the cream frozen in the tubular portions 8, as clearly shown in Figure 4 of the drawings. These pins or prongs 17 engage the cream in the forms so that the mold may be removed therefrom, as will appear from the following description and enable the forms to be dipped in chocolate, but said pins or prongs also provide central bores in the forms so that sticks may be engaged therewith, as will also appear from the following description.

To more clearly set forth the structure of the aforesaid pins and the construction of the device carrying same, reference may be had to Figures 15 to 20, inclusive, of the drawings. These pins or prongs are hollow, as shown in Figure 16, the ends thereof being plugged with solid cone-like tips 18 and as many prongs or pins may be provided as there are tubular members in the mold. As shown in the drawings, there are six prongs since the particular mold disclosed contains six tubular members but it will be understood that this may be varied in number as desired. As shown, each pair of pins 17 is mounted upon a block 19, the three blocks supporting the six pins being linked together centrally by the link members 20 so that the pins may be adjusted in pairs nearer or further from one another as desired, for a reason to be hereinafter and more particularly set forth. The central block member 19 is of greater length than the other two block members and the pins thereof are not in alignment with the pins of the other blocks. Guide pins 21 are engaged with one end of the block member and projected through openings in the other two block members the opposite ends of the pins 19 being engaged with a fourth block member 22 which acts as a stop for the sliding movement of the end block 19. The tubular pins 17 extend completely through the respective block members as shown in Figure 20 of the drawings and terminate in the openings 23 in the bottom of the block members so that air may circulate through these tubular prongs or pins 17, for a purpose to be hereinafter and more particularly set forth.

As stated previously, after the cream has been frozen in the mold taking the form of the tubular portions 8, the mold is disposed so that the cream in the tubular portions 8 may be projected on to the pins 17 as shown in Figure 4. At this particular time, the mold is ready to be removed. In order to assist in the removal of the cream from the mold a water pipe 23 is adapted to be connected with the upper threaded opening 13 of the mold and water passing through the mold will obviously assist in the withdrawal of the mold from the cream. When the mold has been withdrawn, the water may be withdrawn from the mold. While I have herein described the use of water to assist in the removal of the cream from the mold, it will be understood that I may use other mediums such as hot air or steam to be circulated through the mold to assist in the removal of the cream from the latter. I do not wish to be limited to any particular medium for removal. Then the ice cream which will take the form of the tubular members 8 will be in tubular sticks or bars and will remain projected on the pins or prongs 17 as shown in Figure 5 of the drawings. For convenience, I have designated these ice cream bars or sticks which have been shaped to conform to the tubular members 8 by the numeral 8a. It may be necessary after the mold has been removed to further freeze these forms 8a for a short period of time as for instance, five minutes and if this is found to be desirable or necessary, the blocks carrying the pins 17 and the forms 8a may be bodily introduced into a freezing chamber.

The ice cream forms are now ready to be dipped into chocolate for the coating or casing. Thereupon, the blocks are inverted to a position as shown in Figure 6 and dipped into a receptacle 24 which contains a special chocolate mixture 25. The dipping is a very quick operation and the forms are very quickly removed after which the ice cream will be encased or coated with chocolate which I have designated in the drawing by the numeral 26. In the dipping of the forms into the chocolate mixture, I desire to utilize the extension of the blocks 19 to their most distant positions with respect to one another. In other words, the blocks are moved from the position as shown in Figure 17 to the position as shown in Figure 18 prior to dipping the ice cream into chocolate so that there will be no opportunity for the chocolate becoming bridged between the respective ice cream forms. The dipping of the cream in the chocolate mixture is a very rapid operation and the chocolate will adhere very quickly on the cream and form a thin coating or casing for the cream.

After the cream has been encased in the chocolate, the same is adapted to be removed and enclosed in wrappers. For this purpose, I have provided a block or supporting member 27 which is provided with a plurality of annular troughs 28 in which are supported the tubular wrappers 29, the latter being formed of waxed or parchment paper. After the cream has been coated with chocolate, the supporting blocks 19 on the pins of which are carried the ice cream bars, are disposed over the support 27 and the wrappers 29 thereon are positioned so as to each receive therein a coated ice cream bar or stick. Being in an inverted position, the tendency would be for the ice cream bar or stick to drop from the prong or pin 17, but this dropping of the ice cream bars from the prongs 17 into the wrappers 29 is facilitated by reason of the hollow condition of the prongs or bars 17 which allow air to pass therethrough. When suspended in the air for possibly five to seven seconds, the ice cream bars will drop from the prongs 17 into the wrappers 19 to be supported on the block 27. Thereupon the bars of cream may be removed and may be wrapped neatly with the wrappers 29 at the outer end thereof and wooden sticks or handles 30 may be projected into the portion of each bar or stick of cream which bars were formed by the prongs 17. In Figure 7, I have shown the position of the bars or sticks of cream after they have left the prongs 17 and dropped on the support within the respective wrappers 29. In Figure 8, I have shown a bar or stick of cream to which has been applied the wooden stick 30 but with the wrapper removed. Obviously, the paper wrapper 29 applied to the cream will enable the same to be handled in a sanitary manner. When sold the consumer removes the wrapper and may eat the chocolate coated ice cream bar or stick without touching his hands to the ice cream since the stick or handle member 30 enables this to be readily accomplished. Of course, it is understood that after the ice cream bar or stick has been wrapped with the casing or wrapper 29, it is to be placed in a refrigerator or other freezing chamber until it is ready for consumption.

As stated previously, the mold and apparatus disclosed is of a size and shape for producing a certain number of ice cream bars or sticks but it will be understood that this may be varied or otherwise changed to meet the requirements of the manufacturer. The mold may be of such size as to produce at one operation numerous ice cream bars and likewise the apparatus used in association therewith will be varied accordingly. This may be varied, of course, according to the size, character and necessities of the plant in which the device is used.

While I have described my method and apparatus as applicable in the manufacture of ice cream bars, it will be understood that it is equally well applicable to the manufacture of ices or ice bars or fruit ice bars or sticks and while I have shown and described the method and apparatus for coating the bars or sticks, it will be understood that the ice cream or ice sticks or bars may be produced without the coating. I do not wish to be limited particularly to ice cream or ices nor do I wish to be limited to the coating of the bars or sticks. Slight changes in the method and apparatus may be made within the spirit of the invention.

From the foregoing description of the construction of my improved apparatus and the method of applying the same to use, it will be seen that I have provided a simple, inexpensive and efficient means for carrying out the objects of the invention.

While I have particularly described certain elements adapted to perform the functions set forth, it is obvious that various changes in form, proportion and in the minor details of construction may be resorted to without departing from the spirit of the invention or sacrificing any of the principles thereof.

Having thus described the invention, what I claim is:

1. A method of producing ice cream bars or the like, comprising mixing of cream to a semi-frozen state, applying a plunger-like mold to a quantity of such cream to fill predetermined portions of the mold, freezing the cream in said mold to a full frozen state and then withdrawing the frozen cream from said mold.

2. A method of producing coated ice cream bars and the like, comprising mixing of cream to a semi-frozen state, plunging a mold into a quantity of said cream to fill predetermined portions of said mold, freezing the cream in said mold to a full frozen state, withdrawing the cream from said mold and dipping the cream in a mixture to coat and encase the same.

3. A method of producing coated ice cream bars and the like, comprising mixing of cream to a semi-frozen state, plunging a mold into a quantity of said cream to fill predetermined portions of said mold, freezing the cream in said mold to a full frozen state, to form frozen masses, withdrawing the frozen masses of cream from said mold, dipping the frozen masses of cream in a chocolate mixture to coat and encase the same, and applying a stick to each of the frozen masses of cream after coating to support the cream and facilitate consumption thereof.

4. A method of producing coated ice cream bars comprising the mixing of cream to a semi-frozen state, plunging a mold into a quantity of such cream to fill predetermined portions of said mold to form frozen masses, freezing the cream in said mold, supporting the filled mold on means projected into the masses of frozen cream within said mold, removing the mold to permit the masses of frozen cream to remain projected on said means, and applying the masses of frozen cream so projected into a chocolate mixture to coat and encase the cream.

5. A method of producing coated ice cream bars and the like comprising the mixing of cream to a semi-frozen state in a receptacle, plunging a mold into such cream in the receptacle to fill predetermined portions of the mold therewith, freezing the cream in the mold and receptacle to form frozen masses, removing the filled mold from the receptacle, projecting supporting means into the masses of frozen cream in said mold, removing the mold to permit the masses of frozen cream to remain projected on said supporting means, and then coating the masses of frozen cream with a chocolate mixture to encase the same.

6. A method of producing coated ice cream bars and the like comprising the mixing of cream to a semi-frozen state in a receptacle, plunging a mold into such cream in the receptacle to fill predetermined portions of the mold therewith, freezing the cream in the mold and receptacle to form frozen masses, removing the filled mold from the receptacle, projecting supporting means into the masses of frozen cream in said mold, removing the mold to permit the masses of frozen cream to remain projected on said supporting means, dipping the masses of frozen cream while on said supporting means in a chocolate mixture to encase the same, and removing the coated masses of frozen cream from the supporting means.

7. A method of producing coated ice cream bars or the like, comprising the mixing of cream to a semi-frozen state, applying a plunger-like mold to a quantity of such cream to fill predetermined portions of the mold, freezing the cream in said mold to a full frozen state to form masses of frozen cream, impaling the respective masses of frozen cream in said mold on supporting pins, removing the mold to permit the ice cream to remain supported on said pins, and dipping of the masses of frozen cream while impaled on said pins in a mixture of chocolate to coat and encase the cream.

8. A method of producing coated ice cream bars comprising the mixing of cream to a semi-frozen state, applying a plunger-like mold to a quantity of said cream to fill predetermined portions of the mold, freezing the cream in said mold to a full frozen state to form masses of frozen cream, supporting the masses of frozen cream in the mold on means impaled within the cream, removing the mold to permit the masses of frozen cream to remain on said supporting means, coating the cream while on the supporting means with a chocolate mixture, depositing the masses of frozen cream in wrappers and applying a stick to each mass of frozen cream to facilitate the handling thereof.

9. In a mold for forming ice cream bars and the like, a casing, a plurality of tubular members carried therein and opening through said casing at the upper and lower portions thereof, said tubular members constituting cream receiving pockets of said mold and each being of an even diameter for practically its entire depth but having its upper end tapered, a partition in said casing dividing the same into upper and lower compartments, and means in said casing for the circulation of air and water through the compartments and around said tubular members.

10. A mold for ice cream bars and the like comprising a casing having a shell, top and bottom members therefor provided with aligned openings, tubular members mounted in the shell and secured at their upper and lower ends in the openings of said top and bottom members, said tubular members being spaced from one another and spaced from the walls of said casing, a partition wall in said shell dividing the casing into upper and lower chambers and formed with openings through which the tubular members pass, a hollow core in said shell closed at its ends by the top and bottom members and formed with side openings communicating with the upper and lower chambers; openings being formed in the top and bottom members for the circulation of air and water through the core and shell and around said tubular members.

11. In a means for producing coated ice cream bars and the like, a supporting member comprising a plurality of blocks linked together for movement towards and away from each other, bars carried by one block and slidably engaged through openings in other blocks to guide movement of the blocks and a plurality of upstanding impaling pins carried by said blocks, said pins being hollow and mounted in the blocks for the admission of air therethrough.

12. A method of producing coated ice cream bars consisting in mixing cream to a semi-frozen state in a receptacle, plunging a mold into such cream in the receptacle to fill predetermined portions of the mold therewith, freezing the cream in the mold and receptacle to form masses of frozen cream in the mold, removing the filled mold from the receptacle and circulating cold air through said mold to freeze evenly the contents thereof, projecting a supporting means into the masses of frozen cream in said mold, removing the mold to permit the masses of frozen ice cream to remain projected on said supporting means and then coating the masses of frozen cream with a chocolate mixture to encase the same.

13. A method of producing coated ice cream bars consisting in mixing cream to a semi-frozen state in a receptacle, plunging a mold into such cream in the receptacle to fill predetermined portions of the mold therewith, freezing the cream in the mold and receptacle to form masses of frozen cream in the mold, removing the filled mold from the receptacle and circulating cold air through said mold to freeze evenly the masses of cream therein, projecting a supporting means into the masses of frozen cream in said mold, circulating a medium through said mold to assist in the removal of the mold from the masses of frozen cream, removing the mold to permit the masses of frozen cream to remain projected on said supporting means and then coating the masses of frozen cream with chocolate mixture to encase the same.

14. A method of producing coated ice cream bars and the like, comprising the mixing of cream to a semi-frozen state in a receptacle, plunging therein a mold containing a plurality of tubular compartments open at their ends and each tapered smaller toward one end, whereby to fill said compartments with the semi-frozen cream, freezing the cream in the mold and receptacle, removing the filled mold from said receptacle, impaling the respective frozen masses of cream in said mold on supporting pins, removing the mold to permit the masses of frozen cream to remain supported on said pins and coating the impaled masses of frozen cream with a mixture of chocolate to encase the same.

15. In a means for producing coated ice cream bars and the like, a support comprising a plurality of blocks movable towards and away from each other, bars firmly carried by one block and slidably engaged through openings in another block to guide movement of the blocks and retain the blocks parallel and impaling pins carried by said blocks and projecting upwardly from the same.

16. In a means for producing coated ice cream bars and the like, a support comprising end blocks, bars connecting said end blocks, intermediate blocks slidable along said bars between the end blocks, and impaling pins extending upwardly from said blocks.

17. In a means for producing coated ice cream bars and the like, a support comprising end blocks, bars connecting said end blocks, intermediate blocks slidable along said bars between the end blocks, pivoted links connecting the intermediate blocks with each other and connecting one intermediate block with one end block whereby the intermediate blocks will be caused to move together between the end blocks when slid along said bars, and impaling pins rising from said blocks.

In testimony whereof I affix my signature.

WILLIAM MAURER.